United States Patent
Jiang et al.

(10) Patent No.: US 12,534,089 B2
(45) Date of Patent: Jan. 27, 2026

(54) METHOD AND SYSTEM FOR COLLECTING VEHICLE DRIVING DATA

(71) Applicant: Shenzhen 8k-link Optoelectronics Technology Co., Ltd., Shenzhen (CN)

(72) Inventors: Jun Jiang, Shenzhen (CN); Xinghui Jin, Shenzhen (CN); Lingfeng Tang, Shenzhen (CN); Xiaoxia Lei, Shenzhen (CN); Jian Zhou, Shenzhen (CN)

(73) Assignee: Shenzhen 8k-link Optoelectronics Technology Co., Ltd., Shenzhen (CN)

( * ) Notice: Subject to any disclaimer, the term of this patent is extended or adjusted under 35 U.S.C. 154(b) by 711 days.

(21) Appl. No.: 17/808,332

(22) Filed: Jun. 23, 2022

(65) Prior Publication Data
US 2022/0410909 A1  Dec. 29, 2022

(30) Foreign Application Priority Data
Jun. 27, 2021 (CN) .......................... 202110715442.4

(51) Int. Cl.
*B60W 40/09* (2012.01)
*B60W 50/14* (2020.01)
(Continued)

(52) U.S. Cl.
CPC ............ *B60W 40/09* (2013.01); *B60W 50/14* (2013.01); *G06F 1/12* (2013.01); *G07C 5/008* (2013.01);
(Continued)

(58) Field of Classification Search
CPC ................. B60W 40/09; B60W 50/14; B60W 2050/146; B60W 2555/20; G06F 1/12;
(Continued)

(56) References Cited

U.S. PATENT DOCUMENTS 5,552,921 A      9/1996  Hetzel et al.
11,526,711 B1 * 12/2022 Cardona ............ G01C 21/3461
(Continued)

FOREIGN PATENT DOCUMENTS

CN       101868767 A      10/2010
CN       103076187 A      5/2013
(Continued)

OTHER PUBLICATIONS

Office Action dated Oct. 31, 2022 in co-pending Chinese Patent Application No. 202110715442.4.

*Primary Examiner* — James J Lee
*Assistant Examiner* — Jonathan E Reinert
(74) *Attorney, Agent, or Firm* — Thomas Horstemeyer, LLP

(57) ABSTRACT

The present disclosure provides a method and system for vehicle driving data collection. The method includes: sending, by a vehicle central processor, a data collection instruction and a synchronization clock signal to each onboard sensor, wherein the data collection instruction is a control signal for the sensor to be turned on or off; converting vehicle driving data and environmental data collected by the onboard sensor into a digital signal, adding a time stamp to the collected vehicle driving data and environmental data, and transmitting uncompressed digital signal to the vehicle central processor through an optical fiber; and synthesizing, by the vehicle central processor, the collected vehicle driving data and environmental data, and synchronizing the collected vehicle driving data and environmental data according to the time stamp, to obtain a driving state of the vehicle.

6 Claims, 3 Drawing Sheets

(51) Int. Cl.
    *G06F 1/12* (2006.01)
    *G07C 5/00* (2006.01)
(52) U.S. Cl.
    CPC ... *B60W 2050/146* (2013.01); *B60W 2555/20* (2020.02)
(58) Field of Classification Search
    CPC ......... G06F 1/14; G07C 5/008; G07C 5/0866; B60R 16/0231
    See application file for complete search history.

(56) References Cited

U.S. PATENT DOCUMENTS

| | | | |
|---|---|---|---|
| 2014/0365702 A1* | 12/2014 | Ray | G06F 13/4068 710/305 |
| 2018/0270042 A1* | 9/2018 | Yang | G08G 5/26 |
| 2019/0300156 A1* | 10/2019 | Suzuki | B64C 13/505 |
| 2019/0386702 A1* | 12/2019 | Mizutani | B60R 16/0231 |
| 2023/0124064 A1* | 4/2023 | Fujiwara | H01J 37/32165 327/291 |

FOREIGN PATENT DOCUMENTS

| | | |
|---|---|---|
| CN | 103219033 A | 7/2013 |
| CN | 103434461 A | 12/2013 |
| CN | 110850711 A | 2/2020 |

* cited by examiner

METHOD AND SYSTEM FOR COLLECTING VEHICLE DRIVING DATA

CROSS REFERENCE

The present application is based upon and claims priority to Chinese Patent Application No. 202110715442.4, filed on Jun. 27, 2021, and the entire contents thereof are incorporated herein by reference.

TECHNICAL FIELD

The present disclosure relates to the field of automobiles, in particular to a method and system for collecting vehicle driving data.

BACKGROUND

With the rapid development of the automotive industry and automotive autonomous driving technology, the requirements for vehicle driving data collection, transmission, and processing are getting higher and higher. The vehicle driving data collection method based on multi-sensor combination has become the basis for the intelligent configuration of contemporary automobiles. At present, the common automotive driving assistance systems generally include cameras (including front-view, rear-view, surround-view, etc.), millimeter-wave radar (front, rear, side, etc.), wheel speed meter, ultrasonic radar, infrared sensor and other various type of sensor, respective types of sensors have different functions.

The amount of collected data becomes greater when more sensors are installed on the vehicle. Although it can provide enough information sources for the on-board computer to cope with the complex driving environment, it also raises higher requirements for data transmission.

It should be noted that, information disclosed in the above background portion is provided only for better understanding of the background of the present disclosure, and thus it may contain information that does not form the prior art known by those ordinary skilled in the art.

SUMMARY

In view of this, the embodiments of the present disclosure provide a method and system for vehicle driving data collection, so as to solve the problem of slow transmission rate of the existing vehicle driving data collection.

According to a first aspect, the present disclosure provides a method for vehicle driving data collection, including:
sending, by a vehicle central processor, a data collection instruction and a synchronization clock signal to each onboard sensor, wherein the data collection instruction is a control signal for the sensor to be turned on or off;
converting vehicle driving data and environmental data collected by the onboard sensor into a digital signal, adding a time stamp to the collected vehicle driving data and environmental data, and transmitting uncompressed digital signal to the vehicle central processor through an optical fiber; and
synthesizing, by the vehicle central processor, the collected vehicle driving data and environmental data, and synchronizing the collected vehicle driving data and environmental data according to the time stamp, to obtain a driving state of the vehicle.

According to a second aspect, the present disclosure provides a system for vehicle driving data collection, including:
an instruction sending module, configured to send, by a vehicle central processor, a data collection instruction and a synchronization clock signal to each onboard sensor, wherein the data collection instruction is a control signal for the sensor to be turned on or off;
a data transmission module, configured to convert vehicle driving data and environmental data collected by the onboard sensor into a digital signal, add a time stamp to the collected vehicle driving data and environmental data, and transmit uncompressed digital signal to the vehicle central processor through an optical fiber; and
a data synchronizing module, configured to synthesize, by the vehicle central processor, the collected vehicle driving data and environmental data, and synchronize the collected vehicle driving data and environmental data according to the time stamp, to obtain a driving state of the vehicle.

It is to be understood that both the foregoing general description and the following detailed description are exemplary and explanatory only and are not restrictive of the disclosure, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions of the embodiments of the present disclosure, drawings for illustrating the embodiments or the prior art will be briefly described below. It will be apparent that the drawings in the following description refer only to some embodiments of the present disclosure. For those of ordinary skill in the art, other drawings can also be obtained from these drawings without any creative effort.

DETAILED DESCRIPTION

In order to make the objectives, technical solutions and advantages of the embodiments of the present disclosure more obvious and understandable, the technical solutions of the embodiments of the present disclosure will be described clearly and completely in conjunction with the accompanying drawings of the embodiments of the present disclosure. It is obvious that the described embodiments are part of the embodiments rather than all embodiments of the present disclosure. All other embodiments obtained by one of ordinary skill in the art based on the described embodiments of the present disclosure without the need for creative work are within the scope of the present disclosure. The principles and features of the present disclosure will be described below with reference to the accompanying drawings. The examples are only used to explain the present disclosure, but not to limit the scope of the present disclosure.

The term "comprising" and other similar meaning expressions in the description or claims of the present disclosure and the above-mentioned drawings are intended to cover non-exclusive inclusion, e.g., a process, method or system or device comprising a series of steps or units is not limited to the listed steps or units.

It should be noted that there are various restrictions on the transmission of data collected by sensors on the car through dedicated copper cables: i) the carrying bandwidth of the copper cables transmitting high-speed signals is limited (the upper limit of the transmission rate at a distance of 5 meters is about 6 Gbps), which cannot reliably handle a large amount of high-speed data transmission; ii) in order to eliminate the bottleneck of the transmission rate, the data is generally compressed and then transmitted after the data is collected, and after receiving the signal, the processor processes the data after decompressing the data, which will inevitably lead to data transmission delay and loss of some details; iii) during the process of transmitting high-speed signal with copper wire, it is easily interfered by environmental factors such as surrounding electromagnetic signals and temperature, which may increase data delay, or even cause data loss or error. The increase of the onboard electrical equipment makes the electromagnetic interference problem more and more serious, and this problem is more significant in new energy vehicles; and iv) when using copper wire for transmission, in order to increase the transmission bandwidth and transmission distance, it is necessary to increase the cross-sectional area of the cable, and the volume and weight of the cable are greatly increased for more and more sensors, which one the one hand will bring about a substantial increase in the manufacturing cost and user cost of the vehicle, and on the other hand the thick cables will also occupy more space and increase the difficulty of wiring.

Figure 1:
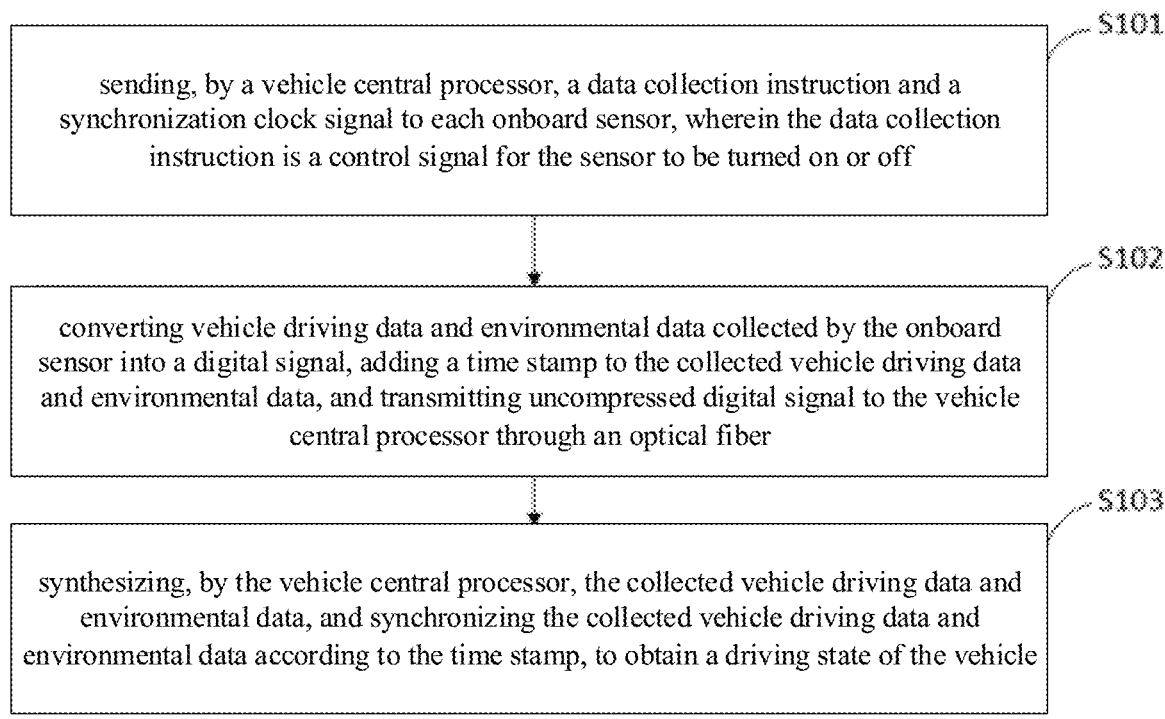
FIG. 1 illustrates a schematic flowchart of a method for collecting vehicle driving data according to an embodiment of the present disclosure.

Referring to FIG. 1, which illustrates a schematic flowchart of a method for collecting vehicle driving data according to an embodiment of the present disclosure, including the follows.

In S101, the vehicle central processor sends a data collection instruction and a synchronization clock signal to each onboard sensor, and the data collection instruction is a control signal for the sensor to be turned on or off.

The onboard sensors include, but are not limited to, a front-view camera, a front radar, an in-vehicle camera, a side radar, a surround-view camera, a rear radar, a rear-view camera, an infrared sensor, a wheel speed meter, and the like. According to the needs of the vehicle driving system, more or less sensor types can be installed, which is not limited here.

The data collection instruction is a control signal for the sensors to be turned on or off, and used to notify each sensor to start or stop data collection. The control signal is generally a low-frequency electrical signal, which is transmitted to the corresponding sensor through a copper wire. The synchronization clock signal is a timing signal generated by a computer and is used for time synchronization of each collected data.

The data collection instruction is modulated and transmitted on the power line by orthogonal frequency-division multiplexing (OFDM) technology. The synchronization clock signal is transmitted through an optical fiber channel for high frequency synchronization clock signal transmission. Using OFDM technology to modulate such control signals on the power line for transmission can simplify the wiring interface and simplify wiring.

In S102, the vehicle driving data and environmental data collected by the onboard sensor are converted into a digital signal, a time stamp is added to the collected vehicle driving data and environmental data, and uncompressed digital signal is transmitted to the vehicle central processor through an optical fiber.

In the time stamp, necessary time information such as the start and end time of data collection and the exposure time of the camera can be added according to the data processing needs of the processor.

The digital signal (RAW DATA) is modulated into the data sequence corresponding to the selected interface without being compressed or converted, and then converted into an optical signal by a photoelectric conversion chip, and finally input into an optical fiber bundle (one or more fibers) to be transmitted to the processor side.

Specifically, after the digital signal is converted into the optical signal by the photoelectric conversion chip, the optical signal is transmitted through the optical fiber, and a photoelectric conversion chip at the processor side converts the received optical signal into an electrical signal and transmits the electrical signal to the processor.

Preferably, the data collected by the sensor is transmitted through an optical fiber, wherein the optical fiber channel includes at least an optical fiber channel for high-speed data transmission and an optical fiber channel for high-frequency synchronization clock signal transmission. The synchronization clock signal is transmitted through the optical fiber channel for high-frequency synchronization clock signal transmission, and the digital signal is transmitted through the optical fiber channel for high-speed data transmission.

In order to deal with the scenario of multi-sensor working together, the processor needs to synchronize the data in the time dimension during the multi-sensor data synthesizing process. Therefore, the processor sends time data for synchronization to multiple related sensors. This data requires minimal delay and high transmission reliability, a dedicated optical fiber channel is generally used to transmit the synthesizing time data.

In S103, the vehicle central processor synthesizes the collected vehicle driving data and environmental data, and synchronizes the collected vehicle driving data and environmental data according to the time stamp, to obtain a driving state of the vehicle.

The processor synthesizes and splices the data collected by the sensor, and synchronizes the data according to the time stamp, to analyze the synthesized and synchronized data, determine the driving state of the vehicle, and make corresponding driving decisions.

Optionally, after analyzing and processing the collected data, a command signal is sent to the vehicle actuator, the vehicle display system, and the in-vehicle feedback system through an optical fiber.

After analyzing the received collection data, the processor sends operating data or the command signal to the vehicle action actuator (steering control, speed control, chassis control, etc.), vehicle display system (HUD, central control screen, instrument panel, streaming media screen, etc.), in-vehicle feedback system (lane deviation warning system, collision warning system, driver fatigue warning system, etc.). Among these kinds of command signal, the high-speed real-time signal is transmitted to the corresponding system terminal through the optical fiber bundle, while the general power supply or control signal is transmitted through the copper wire bundle, and the OFDM technology can also be used to simplify the interface and the wiring.

Compared with the related art, the method according to the present embodiment may realize: i) using optical fiber for high-speed signal transmission, the bandwidth can easily reach 100 Gbps or even higher within a transmission distance up to hundreds of meters, which can effectively solve the bandwidth bottleneck of multi-high-speed data transmission, and bring greater room for advancement in autonomous driving technology in the context of computing power redundant of the current processor; ii) based on optical fiber transmission, the data collected by various sensors can be directly transmitted without the need for compression and decompression, which can greatly reduce data delay while retaining more original information details; iii) the data is transmitted in the optical fiber in the form of optical signals, and will not have any electromagnetic signal interference; iv) using the optical transmission scheme for data collection and transmission, almost the ideal state of 0 data delay may be achieved; and v) to transmit the same amount of data, the weight and volume of optical fiber are only 1/10 or even less than that of copper wire.

Figure 2:
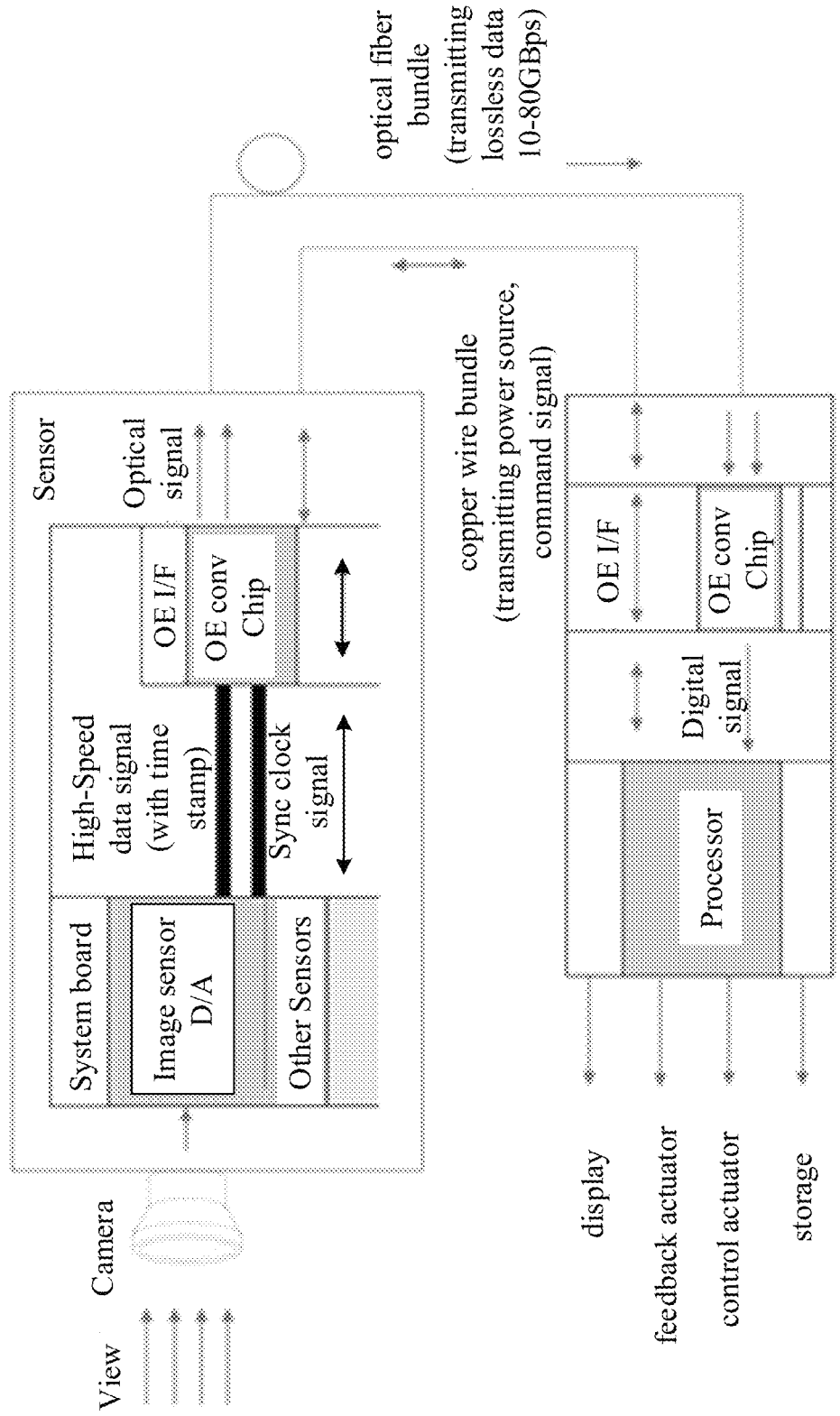
FIG. 2 illustrates another schematic flowchart of a method for collecting vehicle driving data according to an embodiment of the present disclosure.

In another embodiment of the present disclosure, as shown in FIG. 2, after the image data collected by the vehicle-mounted camera is converted into a digital signal by an D/A (analog-to-digital) converter, the digital signal is converted into an optical signal through the photoelectric conversion interface and input to the optical fiber to be transmitted to the processor side. The optoelectronic conversion interface at the processor side converts the optical signal into a digital signal, and the processor synthesizes and synchronizes the digital signal, and analyzes and determines the vehicle status, so as to send control commands to the feedback actuator, the control actuator, and the display on the vehicle. The high-speed data signal and the synchronization clock signal are transmitted through the fiber channel.

It should be understood that the magnitude of the sequence number of each step in the above embodiment does not mean the order of execution, and the execution order of each process should be determined by its function and internal logic, and should not constitute any limitation to the implementation process of the embodiment of the present disclosure.

Figure 3:
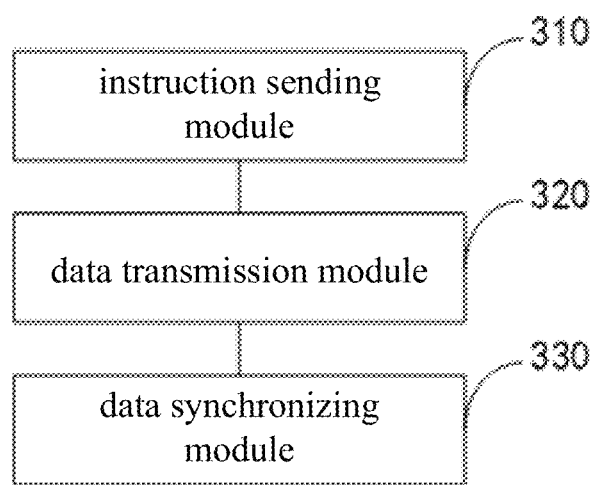
FIG. 3 is a schematic structural diagram of a vehicle driving data collection system according to an embodiment of the present disclosure.

FIG. 3 is a schematic structural diagram of a vehicle driving data collection system according to an embodiment of the present disclosure. The system includes the followings.

An instruction sending module 310, configured to send, by a vehicle central processor, a data collection instruction and a synchronization clock signal to each onboard sensor, wherein the data collection instruction is a control signal for the sensor to be turned on or off.

Preferably, the data collection instruction is modulated and transmitted on the power line by OFDM technology.

The synchronization clock signal is transmitted through the optical fiber channel for high-frequency synchronization clock signal transmission, and the digital signal is transmitted through the optical fiber channel for high-speed data transmission.

A data transmission module 320, configured to convert vehicle driving data and environmental data collected by the onboard sensor into a digital signal, add a time stamp to the collected vehicle driving data and environmental data, and transmit uncompressed digital signal to the vehicle central processor through an optical fiber.

Specifically, after the digital signal is converted into the optical signal by the photoelectric conversion chip, the optical signal is transmitted through the optical fiber, and a photoelectric conversion chip at the processor side converts the received optical signal into an electrical signal and transmits the electrical signal to the processor.

A data synchronizing module 330, configured to synthesize, by the vehicle central processor, the collected vehicle driving data and environmental data, and synchronize the collected vehicle driving data and environmental data according to the time stamp, to obtain a driving state of the vehicle.

Optionally, after analyzing and processing the collected data, a command signal is sent to the vehicle actuator, the vehicle display system, and the in-vehicle feedback system through an optical fiber.

In the embodiment of the present disclosure, by transmitting the data sync signal and the collected data with the optical fiber, it is possible to realize real-time transmission and synchronization of collected data. Using optical fiber for high-speed signal transmission, it is possible to effectively avoid the bandwidth bottleneck of high-speed data transmission. The data collected by various sensors can be directly transmitted without data compression and decompression, which can retain more original information details and greatly reduce data delay, avoiding the transmission delay of collected data. Transmitting in the optical fiber in the form of optical signal will not have any electromagnetic signal interference. Meanwhile, the weight and volume of the optical fiber are only 1/10 or even less than that of the copper wire for the same amount of data transmission.

Those of ordinary skill in the art can understand that all or part of the steps in the methods of the above embodiments can be completed by instructing the relevant hardware through a program, and the program can be stored in a computer-readable storage medium. Some or all of the steps in Embodiment 1 are implemented when the program is executed. The storage medium includes, for example, ROM/RAM, magnetic disk, optical disk, and the like.

In the foregoing embodiments, the description of each embodiment has its own emphasis. For parts that are not described or described in detail in a certain embodiment, reference may be made to the relevant descriptions of other embodiments.

In the above description, the above embodiments are only used to illustrate the technical implementations of the present disclosure, but not to limit them. Although the present disclosure has been described in detail with reference to the foregoing embodiments, those of ordinary skill in the art should understand: the technical implementations described in the embodiments can be modified, or some technical features thereof can be equivalently replaced, while these modifications or replacements do not make the essence of the corresponding technical implementations deviate from the spirit and scope of the technical solutions in the embodiments of the present disclosure.

What is claimed is:

1. A method for vehicle driving data collection, comprising:
   sending, by a vehicle central processor, a data collection instruction and a high-frequency synchronization clock signal to each onboard sensor, wherein the data collection instruction is a control signal for the sensor to be turned on or off;
   converting vehicle driving data and environmental data collected by the onboard sensor into a digital signal, adding a time stamp to the collected vehicle driving data and environmental data, and transmitting uncompressed digital signal to the vehicle central processor through an optical fiber;

wherein the data collection instruction, the high-frequency synchronization clock signal, and the digital signal are transmitted through different paths, wherein the data collection instruction is modulated and transmitted on a power line by orthogonal frequency-division multiplexing (OFDM) technology, the high-frequency synchronization clock signal is transmitted through a first optical fiber channel dedicated for high-frequency synchronization clock signal transmission, and the digital signal is transmitted through a second optical fiber channel for high-speed data transmission; and synthesizing, by the vehicle central processor, the collected vehicle driving data and environmental data, and synchronizing the collected vehicle driving data and environmental data according to the time stamp, to obtain a driving state of the vehicle.

2. The method according to claim 1, wherein the transmitting uncompressed digital signal to the vehicle central processor through the optical fiber comprises:

converting, by a first photoelectric conversion chip, the digital signal into an optical signal;

transmitting, through the optical fiber, the optical signal to a second photoelectric conversion chip; and converting, by the second photoelectric conversion chip the optical signal to an electrical signa, and transmitting the electrical signa to the vehicle central processor.

3. The method according to claim 1, wherein the synchronizing the collected vehicle driving data and environmental data according to the time stamp comprises:

after analyzing and processing the collected data, sending a command signal to a vehicle actuator, a vehicle display system and a vehicle feedback system through the optical fiber.

4. A system for vehicle driving data collection, comprising a vehicle central processor and a non-transitory computer-readable storage medium having a program stored therein, wherein when the program is executed by the vehicle central processor, the execution causes the system to:

send, by a vehicle central processor, a data collection instruction and a high-frequency synchronization clock signal to each onboard sensor, wherein the data collection instruction is a control signal for the sensor to be turned on or off;

convert vehicle driving data and environmental data collected by the onboard sensor into a digital signal, add a time stamp to the collected vehicle driving data and environmental data, and transmit uncompressed digital signal to the vehicle central processor through an optical fiber;

wherein the data collection instruction, the high-frequency synchronization clock signal, and the digital signal are transmitted through different paths, wherein the data collection instruction is modulated and transmitted on a power line by orthogonal frequency-division multiplexing (OFDM) technology, the high-frequency synchronization clock signal is transmitted through a first optical fiber channel dedicated for high-frequency synchronization clock signal transmission, and the digital signal is transmitted through a second optical fiber channel for high-speed data transmission; and synthesize, by the vehicle central processor, the collected vehicle driving data and environmental data, and synchronize the collected vehicle driving data and environmental data according to the time stamp, to obtain a driving state of the vehicle.

5. The system according to claim 4, wherein the transmitting uncompressed digital signal to the vehicle central processor through the optical fiber comprises:

converting, by a first photoelectric conversion chip, the digital signal into an optical signal;

transmitting, through the optical fiber, the optical signal to a second photoelectric conversion chip; and converting, by the second photoelectric conversion chip the optical signal to an electrical signal, and transmitting the electrical signa to the vehicle central processor.

6. The system according to claim 4, wherein the synchronizing the collected vehicle driving data and environmental data according to the time stamp comprises:

after analyzing and processing the collected data, sending a command signal to a vehicle actuator, a vehicle display system and a vehicle feedback system through the optical fiber.

\* \* \* \* \*